United States Patent [19]
Hardie et al.

[11] Patent Number: 5,480,473
[45] Date of Patent: Jan. 2, 1996

[54] METHOD FOR INTENSIFYING THE REACTIONS IN METALLURGICAL REACTION VESSELS

[75] Inventors: Gregory J. Hardie, East Freemantle, Australia; Paul-Gerhard Mantey, Sulzbach-Rosenberg, Germany; Mark P. Schwarz, Clayton, Australia

[73] Assignee: Technological Resources Pty. Limited, Melbourne, Australia

[21] Appl. No.: 134,945

[22] Filed: Oct. 12, 1993

[30] Foreign Application Priority Data

Oct. 16, 1992 [DE] Germany ............ 42 34 974.5

[51] Int. Cl.$^6$ .................................................. C21B 11/00
[52] U.S. Cl. ........................................................ 75/501
[58] Field of Search .................................................. 75/501

[56] References Cited

U.S. PATENT DOCUMENTS

| | | | |
|---|---|---|---|
| 4,936,908 | 6/1990 | Takahashi | 75/501 |
| 5,246,482 | 9/1993 | Murakami | 75/501 |

FOREIGN PATENT DOCUMENTS

| | | |
|---|---|---|
| 0418627A1 | 3/1990 | European Pat. Off. . |
| 3008145C2 | 10/1986 | Germany . |
| 3607776 | 9/1987 | Germany . |
| 3903705A1 | 8/1989 | Germany . |

OTHER PUBLICATIONS

Steel Times International—Incorporation Iron & Steel International, vol. 16, No. 1, Jan., 1992, England GB, pp. 8–11, "HIsmelt revives ironmaking at Kwinana", the whole document.

*Primary Examiner*—Peter D. Rosenberg
*Attorney, Agent, or Firm*—Nikaido, Marmelstein, Murray & Oram

[57] ABSTRACT

The invention relates to a method for intensifying the reactions in metallurgical reaction vessels containing a molten bath to which the reacting agents are fed below and above the bath surface, the gases emerging from the metal bath being afterburned in the space above the smelt by oxidizing gases injected into said gas space and the resulting heat being transferred to the molten bath, whereby fractions of the smelt in the form of drops, splashes and large particles of the smelt move on ballistic trajectories within the gas space of said metallurgical reaction vessel, being ejected from the smelt like a fountain through the amount of gas introduced via underbath tuyères.

15 Claims, 1 Drawing Sheet

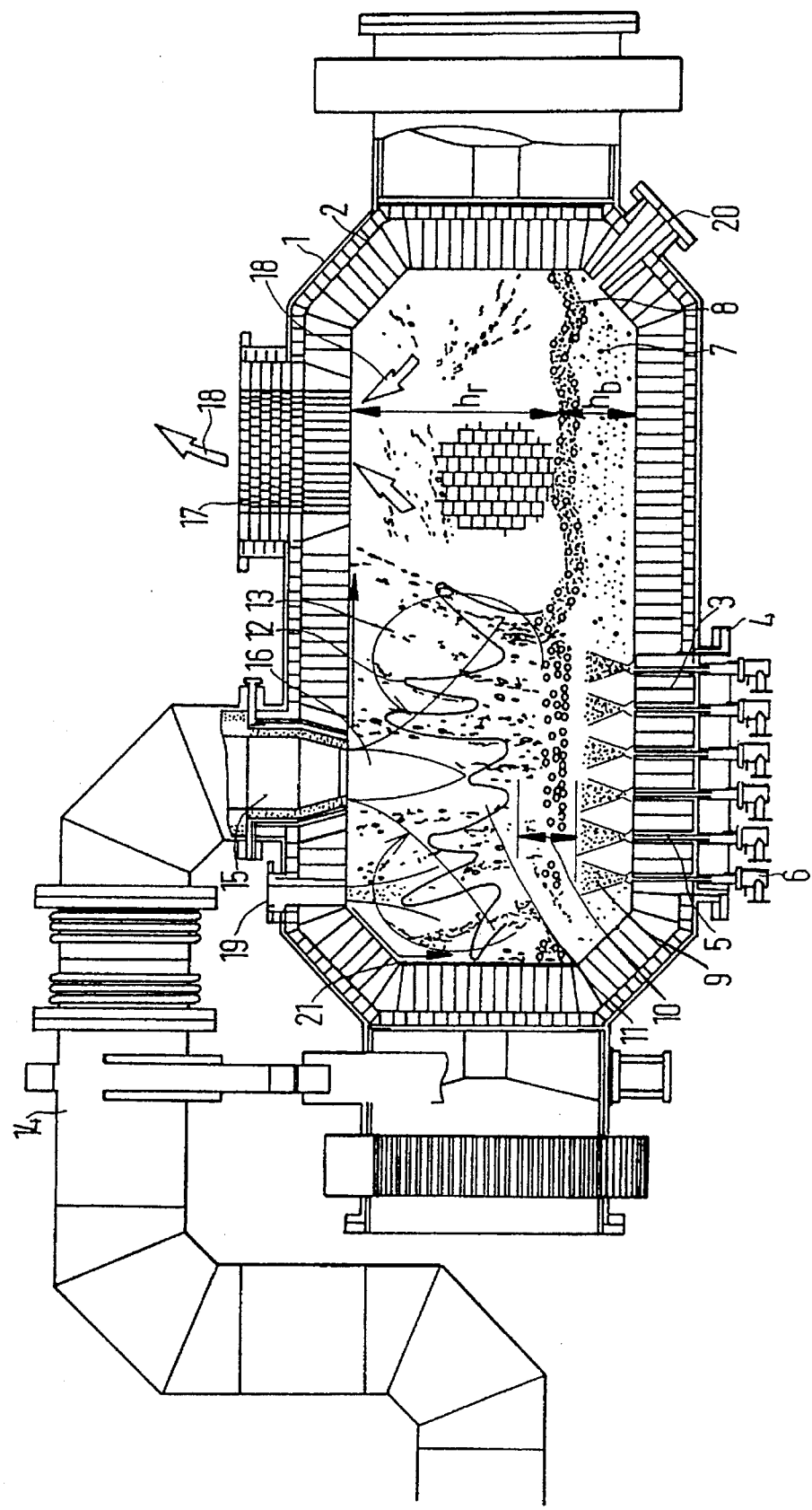

METHOD FOR INTENSIFYING THE REACTIONS IN METALLURGICAL REACTION VESSELS

The present invention relates to a method for intensifying the reactions in metallurgical reaction vessels containing a molten bath to which the reacting agents are fed below and above the bath surface, the gases escaping from the metal bath being afterburned in the space above the smelt by oxidizing gases injected into this gas space and the resulting heat being retransferred to the molten bath.

The development of new metallurgical processes has in recent years been aimed both at increasing productivity and at better utilizing the energy of the supplied fuels. The Howe Memorial Lecture of 1987 entitled "New concepts and methods for iron- and steelmaking" deals for the first time in the field of the ironworks industry with concepts of energy transfer density and the importance of afterburning process gases and retransferring the resulting heat. It discloses figures on the coal consumption for smelting 1 t of scrap as a function of the degree of afterburning, and the energy transfer density in $MW/m^3$ for the hitherto known methods of making pig iron and steel.

The attempt to afterburn the reaction gases, in particular CO to $CO_1$, and utilize the resulting combustion heat for increasing the scrap smelting capacity has been known for some time in steel finery and is also described in protective rights. For example, (East) German patent no. 01 01 916 relates to CO afterburning in the electric arc furnace and the steelmaking converter. It is stated as being essential to the invention that the afterburning tuyères have an approximately horizontal fitting position and the oxygen supply to these tuyères is regulated in relation to the amount of oxygen passing into the smelt through bottom tuyères. However the teachings of this protective right from 1971 have not entered into practical operation.

Only with the method according to German patent no. 27 55 165 has it become possible on a large scale to afterburn an average of about 20% CO and retransfer the obtained heat to the smelt at a high efficiency factor of about 80% to 90%. This clearly increased the scrap rate in steelmaking in the combination-blown converter. The essential feature of this method is to feed about 20% to 80% of the total amount of oxygen to the refining process from above through gas jets directed onto the bath surface that act as free jets blowing into the gas space. A further increase in the scrap rate in steelmaking can be had by supplying carbonaceous fuels to the smelt, and the thermic efficiency of these fuels is likewise improved by afterburning the reaction gases as described in German patent no. 28 38 983.

In the production of nonferrous metals, e.g. in the lead and copper industry, similar methods have been introduced which utilize heat from the afterburning of the reaction gases.

In coal gasification in an iron bath the energy supply to the gasification process can likewise be increased by partial combustion of the produced coal gas. This procedure is of special importance in the gasification of coal qualities with high volatile components which otherwise lead to a cooling of the iron bath. Furthermore, the energy from the partial afterburning of the produced coal gas in the iron bath reactor can also be utilized for reducing iron ore for example. British patent no. 20 82 624 describes such a method.

In the smelting reduction methods for iron ores currently being developed worldwide the productivity of the processes can be increased by coupling the melt-down reactor with prereduction facilities, on the one hand, or by increasing the afterburning rate, on the other. Particularly advantageous embodiments of these two directions of development are described in the hitherto unpublished German patent application no. 42 06 828 and in U.S. Pat. No. 5,051,127. The improvement in productivity in a combination process for smelting reduction of iron ore according to this patent application is characterized in that this combination process comprises at least three process units and the melt-down reactor constitutes one process unit while the partial reduction of the metal ores is performed in at least two further process units, a different waste gas being produced in each of these three process units. The improvement in afterburning according to the U.S. patent is obtained in particular by blowing the jet or jets of oxidizing gases onto the bath surface in the reaction vessel through one or more tuyères with a twist.

European patent application no. 90 116 879.9, publication no. 04 18 627, describes a method for operating a smelting reduction vessel that is characterized in that at least 2000 $kg/m^2$ of slag, based on the bath surface, must be present. The process works with an oxygen top-blowing lance and underbath tuyères through which stirring gas is fed to the molten bath. The afterburning of the reaction gases takes place in a foamed slag layer on the iron bath. According to the formula for calculating the stirring power stated in this patent application this value should be between 1 and 6 kW/t as in claim 4. The flow rates for the amount of stirring gas fed to the smelt through the underbath tuyères are 70 to 450 $Nm^3/h$ and tuyère. With a stated weight of charge of 70 to 110 t and four underbath tuyères, this results in a specific value of 0.05 to 0.3 $Nm^3/t.min$. If the stated flow rates for the stirring gas introduced below the bath surface are exceeded the contact between the top-blown oxygen and the iron smelt is increased in this process. This in turn leads to oxidation of the bath, which results in a reduction of afterburning.

Another published European patent application, no. 03 08 925, relates to a method and apparatus for smelting and reducing iron ores. The characterizing features of this method are that oxygen is blown into the smelting reduction furnace through a top-blowing lance having tuyères for decarburization and additionally for afterburning, and stirring gas through side tuyères and bottom tuyères. The blow rates for the inert stirring gases are 0.5 to 3 $Nm^3/min$ for the bottom tuyères and between 0.3 to 2 $Nm^3/min$ for the side-wall tuyères, based on 1 t of molten bath. Slags and slag forming agents are also fed to the molten bath from the start of the process at rates of 30 to 100 kg/t of metal.

These abovementioned known methods for increasing productivity and improving the energy utilization of the supplied fuels in steelmaking, coal gasification in an iron bath and smelting reduction of iron ores have in common that they have entered into production practice only to a limited extent and that the actual, reliably obtained afterburning rates are lower than expected, reaching values of up to 30% with a simultaneous high heat retransfer of about 70% only in exceptional cases. In addition, increased wear of the refractory lining in the gas space of the reaction vessels is observed the higher the degree of afterburning.

The smelting reduction methods with an oxygen top-blowing lance and a foamed slag layer on the iron bath as a reaction medium are limited with respect to their reactions, since the blow rates of the reacting agents cannot be increased without disadvantages for the buildup and maintenance of this foamed slag layer.

The problem on which the invention is based is to design a method for intensifying the reactions in metallurgical reaction vessels without a foamed slag layer for steelmaking, coal gasification in an iron bath and smelting reduction of metal ores in such a way as to reliably and reproducibly obtain high degrees of afterburning of over 30% with a simultaneous high efficiency factor of over 70% for transfer of the resulting heat to the molten bath and thus a high energy transfer density for the process, in order to intensify the reactions in the metallurgical reaction vessel while maintaining a good concentration balance in the smelt. It is consequently also an objective of the inventive method to increase its productivity when it is applied in a known given metallurgical reaction vessel.

This problem is solved by the inventive method in that fractions of the smelt in the form of drops, splashes and large particles of the smelt move on ballistic trajectories within the gas space of the metallurgical reaction vessel, being ejected from the smelt like a fountain through the amount of gas introduced via underbath tuyères. Preferred further features and embodiments of the invention are stated in subclaims 2 to 14.

The object of the invention is a method for intensifying the reactions in metallurgical reaction vessels containing a molten bath to which the reacting agents are fed below and above the bath surface, the reaction gases escaping from the metal bath being largely afterburned in the gas space above the smelt, where drops and splashes consisting of metal and/or slag are found, by oxidizing gases injected into the gas space, and the resulting heat being retransferred to the molten bath with high efficiency.

The object of the invention is also the use of the method in steelmaking, the production of ferroalloys, coal gasification in an iron bath and smelting reduction of metal ores.

The invention is based on the finding that the reactions are increased by injecting large amounts of gas into the smelt in the reaction vessel below the bath surface.

The invention is also based on the finding that the reactions in metallurgical reaction vessels are increased if fractions of the smelt are ejected from the bath like a fountain through the amount of gas introduced via the underbath tuyères and these fractions of the smelt move within the gas space in the form of drops, splashes and large particles of the smelt on ballistic trajectories that are only stopped when the smelt fractions hit the vessel wall or the smelt itself, collide with other smelt fractions or are drawn in by the oxidizing gases blown onto the bath in the form of free jets.

The method according to the invention has led in an unforeseeable way to a clear intensification of the reactions in metallurgical reaction vessels with a simultaneous high afterburning rate of over 30% and excellent heat retransfer to the molten bath at an efficiency factor of over 70%. The inventive method makes it possible to introduce amounts of gas of 0.2 $Nm^3$/min to 30 $Nm^3$/min, based on 1 t of molten bath, at a minimum bath depth of about 0.5 m above the underbath tuyères, thereby ejecting fractions of the smelt in the form of drops, splashes and large particles of the smelt like a fountain into the gas space free from foamed slag in the metallurgical reactor. In this gas space the smelt fractions move on ballistic trajectories, contributing with their large surface area to an increased retransfer of heat from the gas space to the smelt. This increased energy transport is an important feature of the invention and the basis for the high introduction rates of gases and solids above and below the bath surface and the resulting intensified reactions in the metallurgical reaction vessels.

The ideas about how the inventive process takes place in the metallurgical vessel can be set forth as follows according to the current level of knowledge. The gases injected or produced below the bath surface cause fractions of the smelt of metal and slag to be ejected from the smelt or the transition zone into the gas space of the vessel like a fountain at an upward velocity. These drops or similar configurations of the smelt move on ballistic trajectories in accordance with Newton's axioms. The smelt fractions can hit other drops and burst or melt and thus change their trajectories until they finally hit the refractory lining in the gas space of the vessel or land in the smelt. In this high-temperature gas space the motions of the drops are determined mainly by their outgoing speed and the influence of gravity since they do not have to overcome any substantial flow resistance and no foamed slag or similar obstacles exist in these surroundings. Only in the area of the afterburning gas jets top-blown at high speed can the drops be entrained or their trajectories influenced, depending on the size of the drops, as of gas rates higher than 50 m/sec. It is also possible for the drops to break down into small particles, and this increase in specific surface area contributes to increasing the thermal and mass transport.

The reacting agents introduced below the bath surface cause drops and splashes of the smelt to be injected continuously into the gas space like a fountain and produce a kind of disperse metal-drop phase. This disperse metal-drop phase has an enormously increased surface area and can thus contribute to an increased, direct energy transport of the afterburning heat to the metal bath. For intensifying the reactions according to the inventive method this increase in surface area by the great number of drops in the gas space is desirable since it causes the high heat exchange between the gas space and the smelt, which in turn permits the high injection rates above and below the bath surface. Rough estimates of the amount of metal drops found in the gas space have yielded reference values of at least 10 kg per ton of smelt at drop diameters of about 0.1 to about 25 mm. It is in the nature of such estimates that these values can vary by integral factors depending on operating conditions.

A further advantageous feature of these relatively high gas injection rates below the metal bath surface and the resulting flow patterns in the smelt is that the bath surface is almost free from slag above the injection plume of each bottom tuyère so that metal drops are blown chiefly into the gas space. Furthermore, the almost slag-free zone causes a high retransfer of heat from the reaction gas afterburning to the metal bath. This probably also explains the small influence of the amount of slag in the working of the inventive method. The process can also be carried out without slag on the bath surface without any recognizable disadvantages.

A particularly important feature of the invention is the disperse distribution of the metal drops in the gas space of the reactor vessel, since this causes a considerable increase in the metal bath surface that is required for the intensified energy and mass transport through the increased injection rates below and above the bath surface.

Compared to these advantageous features of the high gas injection rates below the bath surface in the inventive method, the high amounts of stirring gas fed below the bath surface in known processes working with a foamed slag above the metal bath, so-called deep slag processes, have an adverse effect on the method. Since the afterburning of the reaction gases from the metal bath takes place in a foamed slag layer an intimate mixture of slag and metal bath is required for transferring the afterburning energy from the foamed slag layer to the metal bath. Otherwise there is very great overheating of the foamed slag, entailing reoxidation of the slag, and both lead to increased wear of the converter lining, among other things.

The motion of the metal drops in the foamed slag, and thus the reaction and thermal exchange, are limited by the speed of the turbulent flow, the slag density and its viscosity. The teachings of the inventive method for intensifying the reactions, including the afterburning of the reaction gases and the high heat retransfer to the metal bath, can thus not be applied to these known deep slag processes.

According to the invention the term "reaction gases" refers to all gases participating in the reactions taking place in the reaction vessel between the gases, the molten metal and molten slag and the solids, or being released from the solids at the bath temperature, including the cracking products that form. They thus normally include all gases supplied, apart from the inertly acting or inert gases, such as nitrogen and argon, that are mainly used as conveying gases for the solids. The group of reaction gases includes for example oxygen, air, oxygen-enriched air, carbon dioxide and hydrocarbons such as methane, natural gas, propane and butane. These gases can of course also be fed to the smelt through the underbath tuyères in any desired mixtures, or existing product gases or purified waste gases from the inventive method or other metallurgical processes can be used.

The stated bath levels above the underbath tuyères are based on the theoretically assumed still bath surface. In the operating state of the inventive method the bath surface of course does not exist as one plane; there is a transition zone composed of a mixture of molten metal, molten slag and gas bubbles or even large gas plumes, and in this zone the molten metal/slag has virtually dissolved into droplets, splashes and eruptively rising and ejected smelt fractions. Overlapping by wave and sloshing motions of the smelt can also occur. This mixing or transition zone arises as a transition layer between the metal/slag bath above the underbath tuyères and the actual gas space above the mixing zone.

An essential feature of the invention is to increase the gas flow rates through the underbath tuyères to values such that smelt is spun like a fountain into the gas space and from there partly as far as the lining surface of the reaction vessel. This inventive state of motion in the smelt, in the mixing zone and in the gas space thereabove is obtained by the amount of gas introduced into the smelt through the underbath tuyères. Flow rates between 0.2 Nm$^3$/min and 30 Nm$^3$/min per t of molten bath have proved to be a favorable range. However the inventive method runs particularly advantageously in particular with iron smelts in the range of 0.5 Nm$^3$/min.t to 10 Nm$^3$/min.t of molten bath. The lower limit of reaction gas flow rates results from insufficient bath motion of the smelt at which the inventively high reactions, involving a high energy transfer density, are no longer possible.

The maximum reaction gas flow rate is substantially limited by the fact that so-called blow-throughs must be prevented in the inventive method. "Blow-throughs" refer to an operating state in which gas and/or solids fed to the smelt through bottom tuyères leave the bath again without having completely reacted. These blow-throughs can be avoided by a minimum bath level and smaller nozzle diameters.

According to the invention it has proven sufficient if the bath depth above the tuyères divided by the inside diameter of the underbath tuyères, whereby bath depth and diameter of course have the same dimension, e.g. [m], reaches values equal to or greater than 20. It follows from this relation that at the same bath level a large number of tuyères with a small diameter tends to cause fewer blow-throughs than a smaller number of tuyères with a larger diameter. According to the invention it is advantageous to maintain a minimum bath level of about 0.5 m above the underbath tuyère mouths in order to adjust, at the previously defined high gas injection rates, the described inventive operating state of the smelt with a mixing zone and partial amounts rising therefrom like a fountain in the metallurgical reaction vessel.

According to the invention the gas fraction chemically bound in the solids that is released at the temperature of the smelt must also be taken into consideration when adjusting the total amount of reaction gas fed to the molten bath below the bath surface. Very different amounts of gas can occur with the solids injected below the bath surface, for example with the coal qualities used, as the analyses of gas flame coal and anthracite show.

|  | Gas flame coal | Anthracite |
| --- | --- | --- |
| C [%] | 68.8 | 84.5 |
| H$_2$ [%] | 4.4 | 3.6 |
| O$_2$ [%] | 6.4 | 2.25 |
| N$_2$ [%] | 1.1 | 1.35 |
| H$_2$O [%] | 1.6 | 2.0 |
| S [%] | 0.6 | 0.9 |
| Ash [%] | 6.9 | 5.4 |
| Volatile components [%] | 26.4 | 9.7 |

The oxygen content of the ore fed below the bath surface must also be included in the amount of reaction gas.

A further advantageous feature of the inventive method is its high stirring power in comparison to known processes. This stirring power is determined substantially by the reaction gas flow rates. The high mixing or stirring power is a further precondition for the intensified reactions in this process. Mixing power E in [W] is calculated by a formula developed on the basis of that stated in European patent application no. 04 18 627.

$$E = Q \cdot R \cdot T_1 ((\rho_1 \cdot g \cdot h_b)/P_2) - [W]$$

Q=Gas flow rate [Nm$^3$/s]
R=Gas constant
T$_1$=Bath temperature [°C.]
$\rho_1$=Density of smelt [kg/ Nm$^3$]
g=Acceleration due to gravity [m/s$^2$]
h$_b$=Bath depth [m]
P$_2$=Pressure on bath surface [Pa]

The stirring power determined by this formula and based on the ton of molten bath should be over 6 kW/t for the inventive process. Altogether the stirring power for the inventive method is in the range of from 6 kW/t to 40 kW/t, and the preferred range arises between about 10 kW/t and 25 kW/t.

When the inventive method is applied in modern metallurgical reaction vessels, for example in a steelmaking converter having oxygen feed tuyères in the bottom and oxygen top-blowing means and permitting solids to be supplied through the bottom tuyères, the reactions can be clearly intensified over known methods. The flow rates for the reaction gases are between 1 and 8 Nm$^3$/min.t of pig iron. One feeds to the iron smelt through the bottom tuyères in the converter mainly oxygen as a reaction gas, natural gas as a tuyère protecting medium and the gases chemically bound in the introduced anthracite coal, in particular O$_2$ and H$_2$. The gases escaping from the smelt via the transition zone, chiefly CO and H$_2$, are afterburned to CO$_2$ and H$_2$O by the top-blown oxygen in the gas space of the converter., The afterburning rates are about 32%, i.e. clearly higher than the approximately 20% obtained in known steel refining processes. The efficiency factor for retransfer of the heat produced during afterburning to the smelt is 85%, being promoted substantially by the very turbulent transition zone and the splashes and differently sized fractions of the smelt emerging like a fountain from this transition zone. The inventive method aims at the turbulent, splashing mixing and transition zone characterized by smelt fractions emerging like a fountain, in contrast to the swelling and foaming of the bath in known processes. If there are signs of foamed slag forming in the steelmaking converter this undesirable foamed slag can be immediately eliminated by adding fine-grained, carbonaceous, solid fuels and/or slag forming agents, for example coal and CaO, through the bottom tuyères.

In a further advantageous application of the inventive method for steelmaking and producing ferroalloys, hot air with a temperature of about 1300° C. was used to afterburn the reaction gas in the converter gas space. High afterburning rates of about 50% were obtained, being over 60% when specially developed top-blowing tuyères were used as described for example in German patent no. 39 03 705. This high afterburning level can be adjusted reliably and reproducibly, and the good heat retransfer to the metal bath of at least 80% opens up new possibilities for economical production of steel and ferroalloys. For example, scrap of varying quality and lumpiness, prereduced ores with a low degree of metalization of only about 30% or in particular a high degree of metalization of 90 to 100% and solid pig iron of varying composition can be smelted inexpensively with a low use of external energy, for example carbonaceous fuels. Consumption values in the order of under 100 kg per ton of charge can be achieved, depending on the coal quality used. The charging materials can be introduced into the converter in portions as usual, or they can be fed to the metal bath continuously below and/or above the bath surface. For example, granulated solid pig iron can be injected continuously below the bath surface, and scrap of a suitable size, e.g. shredder scrap, can be fed to the smelt in the converter continuously from above via suitable feeding means.

A particularly advantageous application of the inventive method results in the smelting reduction of metal ores, in particular iron ores and ferriferous ores, for producing pig iron and ferroalloys. A horizontal cylindrical reaction vessel has proven advantageous for this application for example. With this shape of vessel some important features of the inventive method can be realized very favorably. The desired strong turbulence of the transition and mixing zone and the splashes and smelt fractions emerging like a fountain and moving in the gas space on ballistic trajectories can be obtained by a multiplicity of injection plumes formed by the free injection jets above the tuyère mouths. This operating state can be achieved with a multiplicity of tuyères of small diameter and a relatively low bath depth, but greater than 0.5 m, above the tuyères. The vessel height of about 1.5 m in this smelting reduction vessel also contributes to the desired vessel geometry favorable for the inventive method. In this reaction vessel flow rates for the reaction gases of 1 to 10 $Nm^3$/min.t of molten bath have been adjusted without any trouble. Mainly oxygen as the reaction gas, methane as the tuyère protecting medium and the chemically bound gases in the iron ore and the supplied coal with high volatile components were introduced into the molten bath. The smelting reduction process begins without a slag layer on the metal bath; in the course of the process time a molten slag builds up whose alkalinity is about 1.4 in this case due to the addition of lime through the bottom tuyères.

The inventive method can be applied successfully in smelting reduction vessels of the developed processes filed recently and not yet published according to DE 42 06 828, as well as in the methods in this field that are described in German patents nos. 36 07 774 and 36 07 776. In these smelting reduction processes the inventive method leads to a further intensification of the reactions and thus to higher injection rates below and above the metal bath surface, which are reflected in a further increase in the productivity of these methods.

These advantageous effects also result of course in similar smelting reduction methods not specified here that work without foamed slag in the gas space, and it is within the scope of the invention for its teachings to be also utilized for improving known processes and adapted accordingly if required. It has turned out in particular that the inventive method can be successfully applied to intensify reactions and thus increase productivity with any prereduction stage of the metal ores used for smelting reduction, up to fully metalized ores, e.g. sponge iron or iron pellets. For example one can use metal ores without prereduction or with little prereduction up to about the wuestite stage for iron ores, or metal ores with increased metalization of e.g. 30% to 50% and more, up to highly metalized products with 90% to 100% metalization.

The invention shall now be explained in more detail with reference to a drawing and an example.

The FIGURE shows the longitudinal section through a drum-type reaction vessel for smelting reduction of iron ores and ferriferous ores for producing pig iron and ferroalloys.

The cylindrical reaction vessel comprises metal jacket 1 lined with refractory lining 2. In this refractory lining 2 there is changeable bottom portion 3 connected with the reaction vessel by flanges 4. Bottom portion 3 contains underbath tuyères 5 with their supply connections 6. The reaction vessel contains molten bath 7 with slag layer 8. Above the mouths of tuyères 5 one can see injection plumes 9. The smelt above the tuyères is dissolved into transition/mixing zone 10 and gas space 11 thereabove into which smelt pours like a fountain 12 in the form of droplets and splashes 13. Hot air tuyère 15 is supplied via hot blast pipe 14 with preheated air in the temperature range between 1100° and 1500° C., and afterburning jet 16 burns the gases emerging from the smelt, CO and $H_2$, to $CO_2$ and $H_2O$. The resulting heat is retransferred to smelt 7 with the help of smelt parts 12 ejected like a fountain and droplets and splashes 13. The afterburned waste gas, loaded with dust, leaves the reaction vessel through waste-gas port 17 as indicated by arrows 18. The drawing also shows vessel opening 19 through which hot prereduced ore passes into the reaction vessel. Tap hole 20 is for tapping off metal and slag from the smelting reduction vessel. Arrow 21 indicates the wetting of the refractory wall surface by smelt.

In a nonrestrictive example the method for intensifying the reactions in metallurgical reaction vessels shall be explained in more detail for the smelting reduction of iron ore in a horizontal drum-type converter similar to that shown in FIG. 1.

A pilot converter corresponding to FIG. 1 contains an iron smelt weighing 8 t and having a carbon content of 3%. In the inventive process with high intensity of the reactions, about 98 kg/min of Hamersley fine ore, 46 kg/min of brown-coal coke and about 60 $Nm^3$/h of methane for protecting the tuyères are blown through the underbath tuyères into the smelt. These values result in a reaction gas injection rate of about 8 $Nm^3$/min and t of molten bath.

At the beginning of smelting reduction there is no slag on the iron bath. Due to the acidic coal ashes, lime is fed into the smelt likewise through the bottom tuyères at a blow rate of about 3.5 kg/min to improve the slag alkalinity, thus adjusting a slag alkalinity of approximately 1.4. Bath level $h_b$ above the tuyère mouths is 0.47 m, based on the still bath surface, and vessel height $h_r$ measured from the same plane is 1.4 m. The underbath tuyères have an inside diameter of 12 mm and five of them are disposed in this pilot converter.

The stirring power is calculated as 23 kW/t of molten bath. Through a top blowing tuyère above the bottom tuyère area hot air with a temperature of about 1200° C. is blown with a twist onto the smelt in an amount of 6000 Nm$^3$/h plus 1200 Nm$^3$/h O$_2$ enrichment to afterburn the reaction gases from the smelt. The resulting degree of afterburning is 58% with high heat retransfer to the molten bath at an efficiency factor of 85%.

After an about two-hour operating time of this pilot plant for smelting reduction 7.2 t of pig iron with a carbon content of 3% and a temperature of 1450° C. was tapped off. The subsequently tapped amount of slag was 1600 kg.

The method according to the invention has proven its worth in steelmaking and in the production of ferroalloys in a combination-blown oxygen converter, in coal gasification in an iron bath, and in the smelting reduction of ferriferous ores, as well as for producing and refining nonferriferous metals, in particular in copper and lead production.

We claim:

1. A method for intensifying reactions occurring in a process of reducing metal oxide bearing materials in a metallurgical reaction vessel containing a molten bath having a bath surface, comprising feeding reacting agents below and above said bath surface, injecting oxidizing agents into a space in the reaction vessel above said molten bath, afterburning gases emerging from metal bath in said space, introducing gas via underbath tuyères such that fractions of said molten bath in the form of drops, splashes and particles move on ballistic trajectories within said space and produce a disperse metal-drop phase in said space where they pick up energy which is transferred back to said molten bath.

2. The method of claim 1, wherein the ballistic trajectories of the molten bath fractions in said space are changed or stopped when they hit the vessel wall or the molten bath, collide with other molten bath fractions and are drawn in by the oxidizing agents blown onto the bath.

3. The method of claim 1, wherein at least one of reaction gases and inert gases are introduced into the molten bath through the underbath tuyères.

4. The method of claim 1, wherein the amounts of gas introduced through the underbath tuyères also include the gases chemically bound in the injected solids and released at the bath temperature.

5. The method of claim 1, wherein the amounts of gas fed through the underbath tuyères are introduced independently of a slag layer, if present, and the amount of slag on the molten bath.

6. The method of claim 1, wherein an undesirable formation of foamed slag on the metal bath is avoided when the amount of gas is introduced below the bath surface by injecting at least one of fine-grained slag forming agents and solid carbonaceous fuels below the bath surface.

7. The method of claim 1, wherein the amount of gas introduced through the underbath tuyères is fed to the molten bath in the reaction vessel at flow rates between 0.2 Nm$^3$/min and 30 Nm$^3$/min, based on 1 t of molten bath.

8. The method of claim 1, wherein the flow rate of the amount of gas introduced through the underbath tuyères is adjusted in relation to the bath depth of the molten bath above said tuyères.

9. The method of claim 1, wherein the flow rate of the introduced gases is increased as the bath depth below the underbath tuyères increases.

10. The method of claim 1, wherein the underbath tuyères through which the gases are injected into the molten bath have an inside diameter d and are designed to satisfy the relation $h_b/d$=values greater than 20 versus the bath depth $h_b$.

11. The method of claim 1, wherein the stirring power E is adjusted to values between 10 kW/t and 25 kW/t.

12. The method of claim 1, wherein suitable raw materials are fed to the molten bath in portions continuously, or both in portions and continuously, above, below, or both above and below the bath surface for producing metal in the metallurgical reaction vessel.

13. The method of claim 12, wherein the raw materials used are metallic charging materials, suitable scrap metal, prereduced ores (1) that have a high degree of metallization (2) that are completely metallized, or (3) both (1) and (2).

14. The method of claim 1, wherein the amount of gas introduced through the underbath tuyères is fed to the molten bath in the reaction vessel at flow rates between 0.5 Nm$^3$/min and 10 Nm$^3$/min, based on 1 t of molten bath.

15. The method of claim 1, wherein the stirring power E {W/t} is adjusted to values between 6 kW/t and 40 kW/t.

* * * * *

UNITED STATES PATENT AND TRADEMARK OFFICE
CERTIFICATE OF CORRECTION

PATENT NO. : 5,480,473
DATED : January 2, 1996
INVENTOR(S) : Gregory J. Hardie

It is certified that error appears in the above-identified patent and that said Letters Patent is hereby corrected as shown below:

Column 9

In Claim 1, line 7, before "metal" insert --said--.

Signed and Sealed this

Second Day of July, 1996

Attest:

BRUCE LEHMAN

Attesting Officer     Commissioner of Patents and Trademarks